(12) United States Patent
Sensui

(10) Patent No.: US 6,574,437 B2
(45) Date of Patent: Jun. 3, 2003

(54) FOCUS DETECTION APPARATUS

(75) Inventor: Takayuki Sensui, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/883,338

(22) Filed: Jun. 19, 2001

(65) Prior Publication Data

US 2001/0055480 A1 Dec. 27, 2001

(30) Foreign Application Priority Data

Jun. 21, 2000 (JP) ........................................ 2000-185896

(51) Int. Cl.[7] .............................. G03B 13/22; G03B 3/00
(52) U.S. Cl. .............................. 396/81; 396/91; 396/111
(58) Field of Search ........................... 396/81, 111, 114, 396/121, 91; 250/201.2, 201.8

(56) References Cited

U.S. PATENT DOCUMENTS

| 5,206,498 A | 4/1993 | Sensui |
| 5,241,168 A | 8/1993 | Sensui |
| 5,311,004 A | * 5/1994 | Kusaka ..................... 250/201.8 |
| 5,771,413 A | 6/1998 | Suda et al. |
| 5,839,001 A | 11/1998 | Ohtaka et al. |
| 5,864,721 A | 1/1999 | Suda et al. |

FOREIGN PATENT DOCUMENTS

JP 63-11906 1/1988

* cited by examiner

*Primary Examiner*—Russell Adams
*Assistant Examiner*—Arthur A. Smith
(74) *Attorney, Agent, or Firm*—Greenblum & Bernstein, P.L.C.

(57) ABSTRACT

A focus detection apparatus includes a pupil dividing device for dividing an exit pupil of an objective lens into separate areas, a field mask located at a position substantially optically equivalent to an image forming position of the objective lens, a condenser lens located in the vicinity of the field mask to make the exit pupil conjugate with the pupil dividing device, a light quantity distribution forming device for receiving light transmitted through the separate areas and forming light quantity distribution portions wherein the relative position of the light quantity distribution portions varies in accordance with a focus state of the objective lens, and a focus detection apparatus having at least one group of photoelectric transducers which receive the light quantity distributed by the pupil dividing device. The condenser lens is moved in accordance with the position of the exit pupil of the objective lens.

6 Claims, 4 Drawing Sheets

FOCUS DETECTION APPARATUS

BACKGROUND OF THE INVENTION

1. Field of the Invention

The present invention relates to a passive focus detection apparatus, for use with a single lens reflex camera, etc.

2. Description of the Related Art

Almost all of recent single lens reflex cameras are provided with a split pupil phase difference detection type of passive focus detection apparatus. In such a focus detection apparatus, it is important to increase the focus detection area with respect to the field of view formed by an objective lens (photographing lens). Various solutions for obtaining an increased focus detection area have been proposed. For example, it has been proposed to combine a plurality of line sensors or to use an area sensor in order to increase the focus detection area.

However, if a focusing operation is carried out on a portion wherein the focusing detection area is wide, i.e., on a portion wherein the image height of the object is high, a conjugate relationship between the exit pupil of the objective lens and the AF entrance pupil from a wide angle extremity to a telephoto extremity cannot be maintained, so that focus detection cannot be carried out at either the wide-angle extremity or at the telephoto extremity.

In theory, one solution to detect the focus at a high image height h, i.e., in a large object image area (focus detection area), and solve the above-mentioned problem is to fix the size and position of the exit pupil, that is, to restrict usable objective lenses. However, this solution cannot be applied to a single lens reflex camera in which various objective lenses, including zoom lenses of large zoom ratio, having different exit pupil positions and diameters are used.

SUMMARY OF THE INVENTION

It is an object of the present invention to provide a focus detection apparatus in which a large focus detection area can be provided, regardless of the exit pupil position and diameter of the objective lens.

To achieve the object mentioned above, according to the present invention, a focus detection apparatus is provided, including a pupil dividing device for dividing an exit pupil of an objective lens into separate areas; a field mask located at a position substantially optically equivalent to an image forming position of the objective lens; a condenser lens located in the vicinity of the field mask to make the exit pupil conjugate with the pupil dividing device; a light quantity distribution forming device for receiving light transmitted through the separate areas and forming light quantity distribution portions wherein the relative position of the light quantity distribution portions varies in accordance with a focus state of the objective lens; and a focus detection apparatus having at least one group of photoelectric transducers which receive the light quantity distributed by the pupil dividing device. The condenser lens is moved in accordance with the position of the exit pupil of the objective lens.

With this structure, since the condenser lens is moved in accordance with the position of the exit pupil of the objective lens, a light quantity distribution with sufficient quantity of light can be obtained to carry out a precise focus detection.

Preferably, the condenser lens includes a movable lens element which is moved along the optical axis thereof.

The condenser lens can include a plurality of lens elements which are relatively moved along the optical axis thereof.

The condenser lens can include a stationary lens element and a movable lens element, wherein the movable lens element is movable along the optical axis.

Preferably, the focus detection apparatus is provided in a single lens reflex camera, wherein the condenser lens is moved in accordance with the position of the exit pupil of a photographing lens mounted to the single lens reflex camera.

Preferably, the single lens reflex camera further includes a fine movement mechanism which drives the condenser lens in accordance with the position of the exit pupil via a controller.

The photographing lens can include a memory which stores position data of the exit pupil of the photographing lens, wherein the position data of the exit pupil is retrieved by the controller.

In an embodiment, the photographing lens includes a zoom lens; a memory, wherein the position data of the exit pupil is stored in the memory in accordance with a change in a focal length upon zooming of the zoom lens; and a focal length detecting device which detects the focal length which is changed upon zooming. The position data of the exit pupil is retrieved by the controller in accordance with the focal length detected by the focal length detecting device.

The present disclosure relates to subject matter contained in Japanese Patent Application No.2000-185896 (filed on Jun. 21, 2000) which is expressly incorporated herein by reference in its entirety.

BRIEF DESCRIPTION OF THE DRAWINGS

The invention will be discussed below with reference to the drawings, in which.

DESCRIPTION OF THE PREFERRED EMBODIMENT

Figure 1:
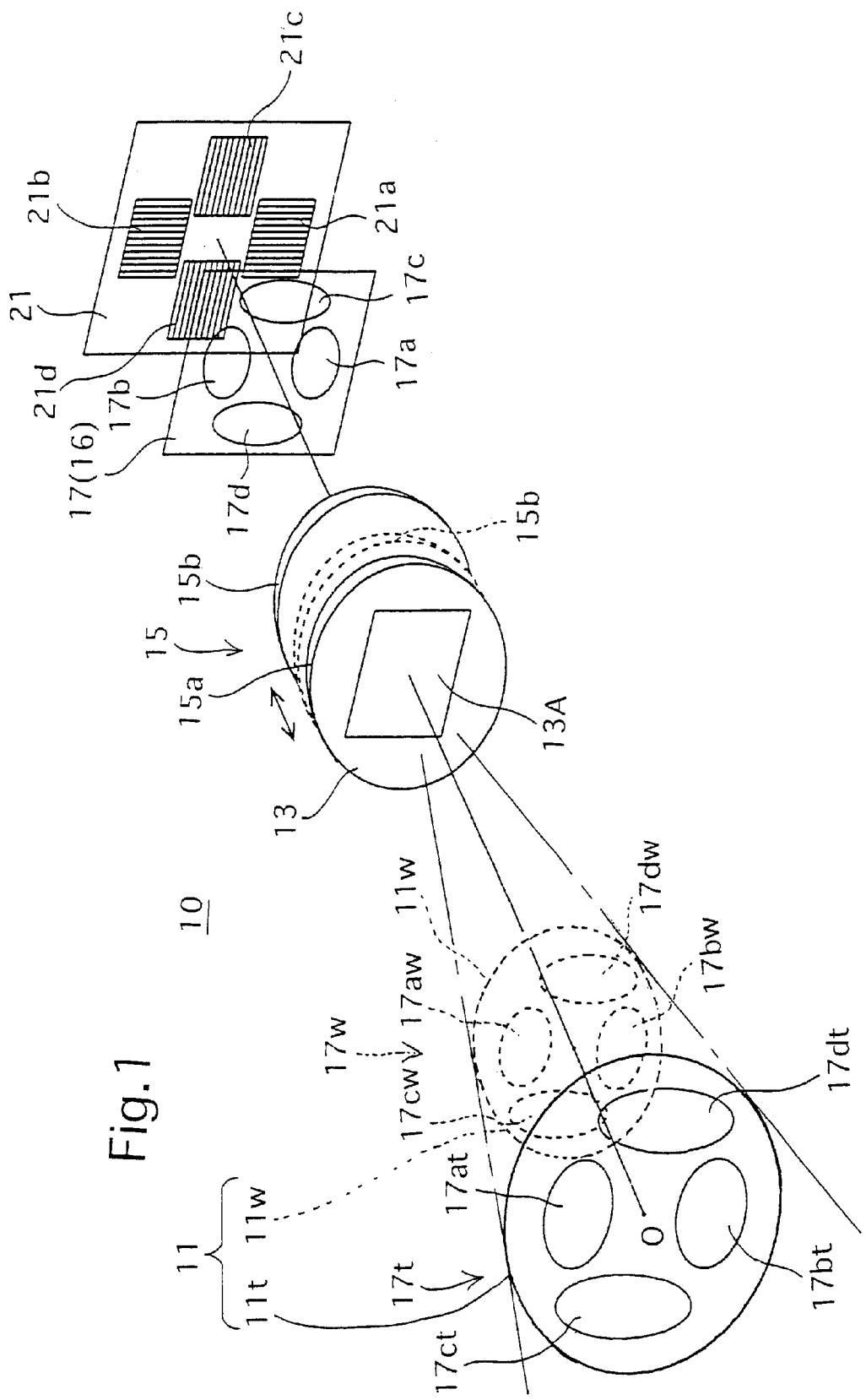
FIG. 1 is a perspective view of the main components of a first embodiment which is applied to a single lens reflex camera having a focus detection apparatus, according to the present invention.

As shown in an embodiment of a focus detection apparatus 10 shown in FIG. 1, focus detection can be carried out in four focus detection areas around the optical axis. In focus detection apparatus 10, light carrying an object image passes through an exit pupil 11 (11$t$ or 11$w$) of an objective lens (photographing lens) L (see FIG. 4), forms an object image on a surface equivalent to a film surface (film equivalent surface) 13, is transmitted through a condenser lens 15, is split into two pairs of light bundles by two sets of separator lenses (light quantity distribution forming device) 17 (17$a$, 17$b$ and 17$c$, 17$d$), and forms two pairs of secondary object images (light quantity distributions) on corresponding two sets of area sensors (photoelectric transducers) 21 (21$a$, 21$b$ and 21$c$, 21$d$). Consequently, the focus state on the film equivalent surface can be detected, based on a phase difference (distance) between the two pairs of the secondary object images received by the area sensors 21*a* through 21*d*. Note that in general, a field mask 13A having a field aperture which restricts the object image area, i.e., the focus detection area provided on each area sensor 21, is provided on the film equivalent surface 13. The separator lenses 17 (17*a* through 17*d*) are provided, on the side thereof adjacent to the field mask 13, with separator masks (pupil dividing device) 16 for dividing the exit pupil of the objective lens L into separate areas, so that the light bundles transmitted through the divided areas can be received by the corresponding separator lens 17 (17*a* through 17*d*).

Figure 2:
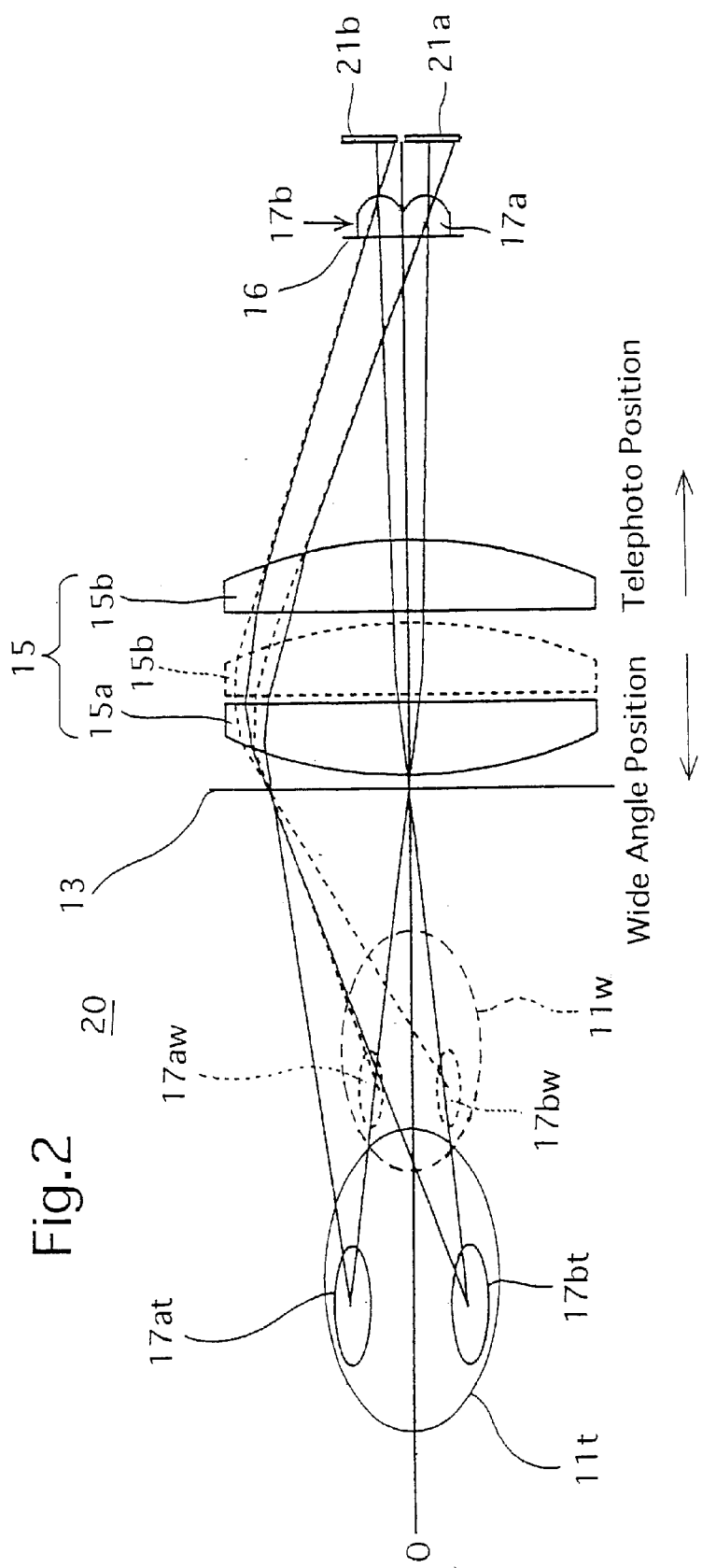
FIG. 2 is a conceptual view of a focus detection optical system of a focus detection apparatus shown in FIG. 1.

One of the most significant features of the focus detection apparatus 10 having the above-described construction is that the condenser lens 15 can be moved in accordance with a focal length of the photographing lens. The condenser lens 15 includes a stationary first condenser lens element 15*a* and a movable second condenser lens element 15*b*. The second condenser lens element 15*b* is moved in accordance with the focal length of the objective lens L, i.e., is moved to a telephoto position when the objective lens L is a telephoto objective lens and to a wide angle position when the objective lens L is a wide angle lens. In FIGS. 1 and 2, the telephoto position and the wide angle position of the second condenser lens element 15*b* are indicated by a solid line and a dotted line, respectively. The exit pupil of the telephoto objective lens and the exit pupil of the wide angle objective lens are indicated at 11*t* and 11*w*, respectively.

The entrance pupil 17*t* (17*at*, 17*bt*, 17*ct* and 17*dt*) when the condenser lens 15 is moved to the telephoto position corresponding to the telephoto objective lens is indicated by a solid line. In this position, the second condenser lens element 15*b* is moved toward the separator lens 17. The entrance pupil 17*w* (17*aw*, 17*bw*, 17*cw* and 17*dw*) when the condenser lens 15 is moved to the wide angle position corresponding to the wide angle objective lens is indicated by a dotted line. In this position, the second condenser lens element 15*b* is moved toward the field mask 13A. Thus, the entrance pupil 17*t* or 17*w* is formed at and within the corresponding exit pupil 11*t* or 11*w* of the objective lens L.

FIG. 2 shows a conceptual view of one focus detection optical system 20 of the focus detection apparatus 10 shown in FIG. 1, to clarify the operation of the condenser lens 15. Furthermore, although light does not actually emit from the sensors, in order to make the following description easier to understand, the following description will be made with reference to light bundles which emit from the center portions of a pair of sensor areas 21*a* and 21*b* and pass through the condenser lens 15. The first condenser lens element 15*a* of the condenser lens 15 adjacent to the filed mask 13A is a planoconvex lens with a convex surface located on the field mask side, and the second condenser lens element 15*b* of the condenser lens 15 adjacent to the separator lens 17 is a planoconvex lens with a convex surface located on the separator lens side.

Light bundles emitted from the center portions of the pair of area sensors 21*a* and 21*b* are transmitted through the pair of separator lenses 17*a* and 17*b*, and are made incident upon the second condenser lens element 15*b* located at the telephoto position. The height of the incident positions from the optical axis on the second condenser lens element 15*b* is low, and hence the refracting power of the second condenser lens element 15*b* and the first condenser lens element 15*a* at the incident positions is small and the angle of deflection is small. Consequently, the light bundles emitted from the first and second condenser lens elements 15*a* and 15*b* are bent only by a small angle. Therefore, the entrance pupils 17*at* and 17*bt* are formed at the telephoto position away from the condenser lens 15. Conversely, if the second condenser lens element 15*b* is located at the wide angle position, the height of the incident positions from the optical axis is high and hence the refracting power of the second condenser lens element 15*b* and the first condenser lens element 15*a* at the incident positions is large and the angle of deflection is large. Consequently, the light bundles emitted from the first and second condenser lens elements 15*a* and 15*b* are bent largely. Therefore, the entrance pupils 17*aw* 17*bw* are formed at the wide angle position closer to the condenser lens 15.

The operation of the first and second condenser lens elements 15*a* and 15*b* becomes apparent from the paraxial resultant focal length.

The resultant focal length f is given by the following equation:

$$1/f = (1/fa) + (1/fb) - (d/fa \cdot fb);$$

$$d = dt \text{ or } dw;$$

wherein fa designates the focal length of the first condenser lens element, fb designates the focal length of the second condenser lens element; d designates distance between the first and second condenser lens elements, wherein dt designates the distance d at the telephoto position (increased distance), and dw designates the distance d at the wide angle position (reduced distance).

When the first and second condenser lenses are both positive lenses, the resultant focal length f is reduced as the distance d between the first and second condenser lens elements is reduced, with the exception of when the distance d between the first and second condenser lens element becomes excessively long so that the combined focal length becomes negative.

The focus detection apparatus 10 of the illustrated embodiment is used as follows in accordance with the position of the exit pupil 11*t* or 11*w* of the objective lens L (see FIG. 4). In the case where the exit pupil of the objective lens L is located at the telephoto position far away from the field mask 13A toward the object, the second condenser lens element 15*b* is moved to the telephoto position, so that the entrance pupil 17*t* (17*at* through 17*dt*) is formed within the exit pupil 11*t* at the telephoto position away from the field mask 13A, whereby no interception of the AF light incident upon the area sensors 21 (21*a* through 21*d*) occurs (no vignetting takes place). In the case where the exit pupil of the objective lens L is located at the wide angle position closer to the field mask 13A, the second condenser lens element 15*b* is moved to the wide angle position, so that the entrance pupil 17*w* (17*aw* through 17*dw*) is formed within the exit pupil 11*w* at the wide angle position close to the field mask 13A, whereby no interception of the AF light incident upon the area sensors 21 (21*a* through 21*d*) occurs (i.e., no vignetting takes place).

Although the above discussion has been applied to a telephoto or wide angle objective lens, it is preferable that the movement of the second condenser lens element 15*b* be determined in accordance with the position of the exit pupil of the objective lens L to be used. Moreover, although the area sensors 21 are used as a group of photoelectric transducers in the illustrated embodiment, line sensors can be used instead.

As the condenser lens (15), any lens which has at least one lens element movable along the optical axis or more than one relatively movable lens element can be used. Furthermore, in the first embodiment of the invention mentioned above, the condenser lens includes a combination of two positive lens elements, however, it is also possible to construct the condenser lens 15 from a positive lens consisting of a positive lens element and a negative lens element as shown in the following second embodiment, or any positive lens having a variable power.

Figure 3:
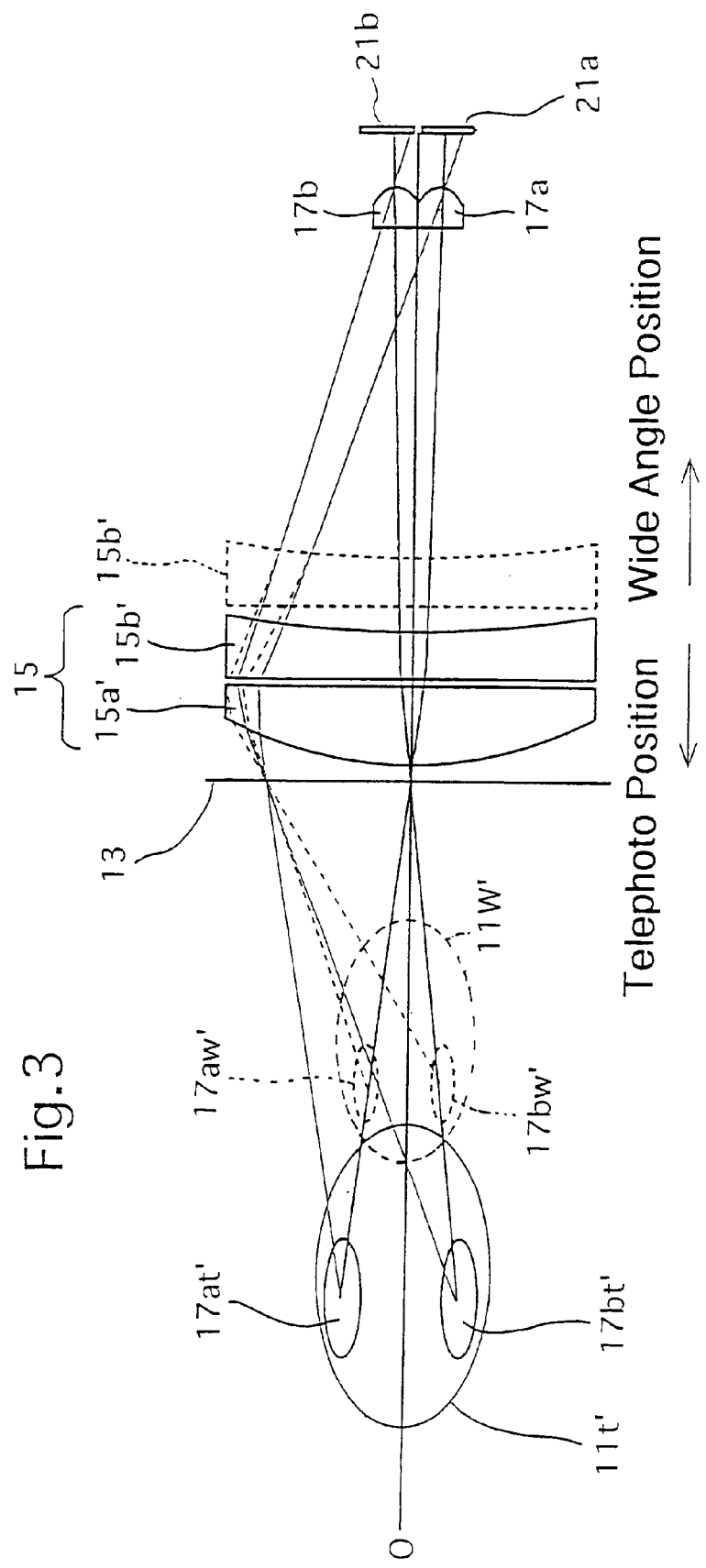
FIG. 3 is a conceptual view of a focus detection optical system of a focus detection apparatus according to a second embodiment of the invention.

FIG. 3 shows a second embodiment of the present invention, in which the condenser lens 15 includes a positive lens element and a negative lens element. In this embodiment, the stationary first condenser lens element 15a, is made of a planoconvex lens with a convex surface located adjacent to the field mask 13A, and the movable second condenser lens element 15b' is made of a planoconcave lens with a concave surface adjacent to the separator lenses 17. Similar to the first embodiment, in the second embodiment, the second condenser lens element 15b' is moved to the telephoto position close to the first condenser lens element 15a' when a telephoto lens is used, so that the entrance pupils 17at' and 17bt' are formed within the exit pupil lit, of the objective lens L far away from the field mask 13A. When a wide angle objective lens is used, the second condenser lens element 15b' is moved to the wide angle position away from the first condenser lens element 15a', so that the entrance pupils 17aw' and 17bw' are formed within the exit pupil 11w' of the objective lens L closer to the field mask 13A.

In the illustrated embodiments, the movable condenser lens element 15b (15b') can be movably supported by, for example, a fine movement mechanism 51 (see FIG. 4) which moves the movable condenser lens element 15b (15b') so that the exit pupil of the 15 objective lens L is substantially conjugate with (or identical or close to) the entrance pupil thereof.

Figure 4:
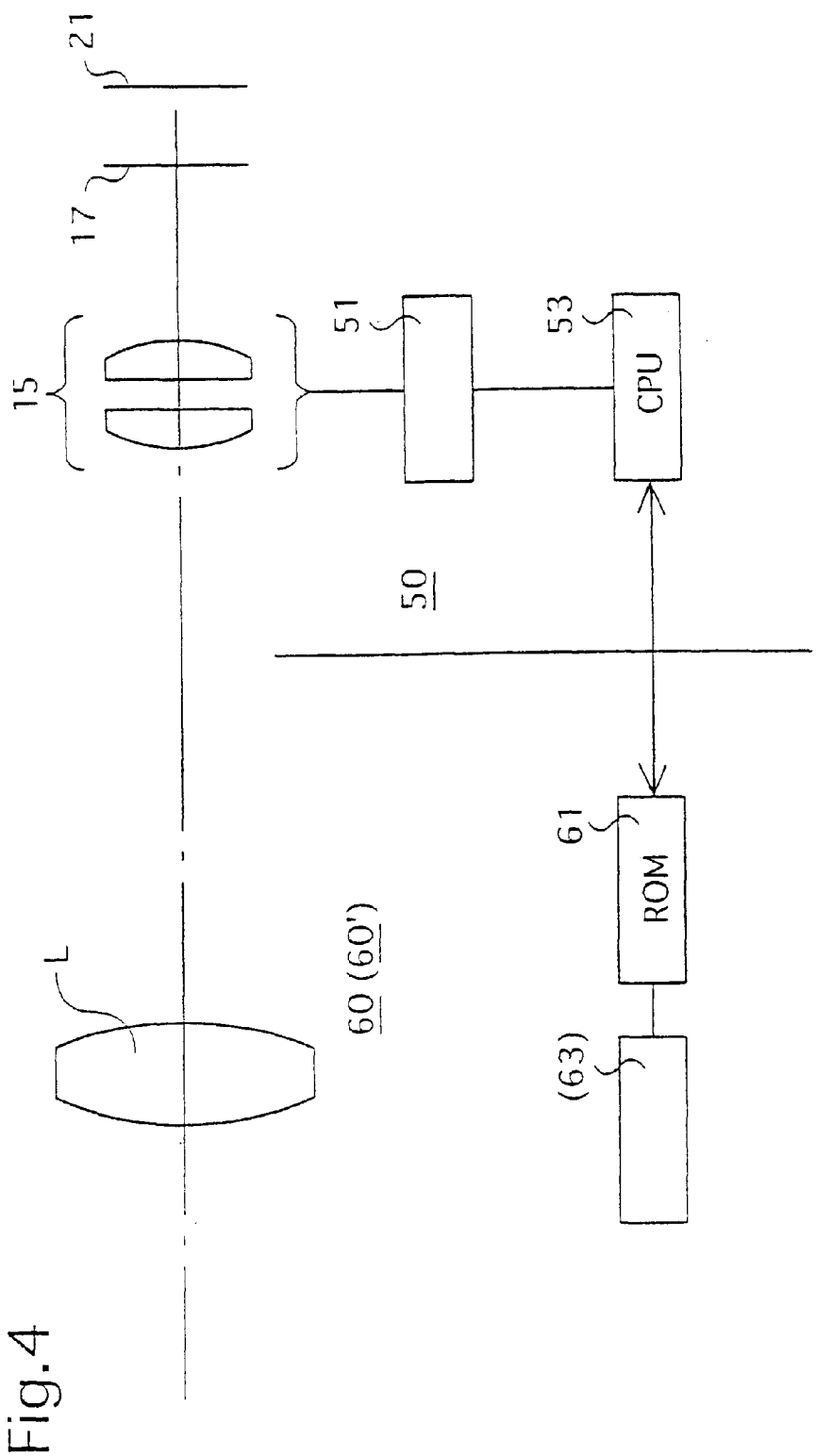
FIG. 4 is a block diagram of a control system incorporated in a single lens reflex camera.

The present invention can be applied to a single lens reflex camera 50, as shown in FIG. 4, wherein the fine movement mechanism 51 can be driven by a controller (CPU or micro computer) 53, provided in a camera body of the single lens reflex camera 50, in accordance with exit pupil position data of an objective lens L (i.e., an interchangeable lens 60) which is stored in a ROM (memory) 61 and which is retrievable by the controller 53. If the objective lens is a zoom lens 60', in which the position and size of the exit pupil vary in accordance with the focal length which in turn varies during the zooming operation, the exit pupil position data corresponding to the focal length is stored in the ROM 61 of the photographing lens so that the exit pupil position data corresponding to the focal length detected by a focal length detecting device 63 can be retrieved by the controller 53.

As can be understood from the above discussion, in a focus detection apparatus according to the present invention, since the entrance pupil position of the focusing optical system is moved in accordance with the exit pupil position of the objective lens L, it is possible to detect an in-focus state in a broad detection area with high precision, regardless of the exit pupil position of the objective lens L.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A focus detection apparatus comprising:
   a pupil dividing device that divides an exit pupil of an objective lens into separate areas, the objective lens defining an optical axis;
   a field mask located at a position substantially optically equivalent to an image forming position of the objective lens;
   a condenser lens, located in a vicinity of the field mask, that enables the exit pupil of the objective lens to conjugate with the pupil dividing device, the condenser lens comprising at least one movable lens element that is moveable along the optical axis in accordance with the position of the exit pupil of the objective lens;
   a light quantity distribution forming device that receives light transmitted through the separate areas and forms light quantity distribution portions, a relative position of the light quantity distribution portions varying in accordance with a focus state of the objective lens; and
   a plurality of photoelectric transducers that receives the light quantity distribution portions and enables detection of the focus state.

2. A focus detection apparatus according to claim 1, wherein the condenser lens further comprises a stationary lens element.

3. A focus detection apparatus according to claim 1, wherein said focus detection apparatus is provided in a single lens reflex camera, wherein the condenser lens is moved in accordance with the position of the exit pupil of a photographing lens mounted to the single lens reflex camera.

4. A focus detection apparatus according to claim 3, wherein said single lens reflex camera further comprises a fine movement mechanism which drives said condenser lens in accordance with the position of the exit pupil via a controller.

5. A focus detection apparatus according to claim 3, wherein said photographing lens comprises a memory which stores position data of the exit pupil of said photographing lens, wherein said position data of the exit pupil is retrieved by said controller.

6. A focus detection apparatus according to claim 3, wherein said photographing lens comprises:
   a zoom lens;
   a memory, wherein said position data of the exit pupil is stored in said memory in accordance with a change in a focal length upon zooming of said zoom lens; and
   a focal length detecting device which detects said focal length which is changed upon zooming; wherein
   said position data of the exit pupil is retrieved by said controller in accordance with said focal length detected by said focal length detecting device.

* * * * *